Jan. 1, 1952  J. I. DILEY  2,580,530
BATTERY SUMP
Filed Nov. 25, 1947

INVENTOR.
JAMES I. DILEY
BY
McMorrow, Berman & Davidson
Attorneys

Patented Jan. 1, 1952

2,580,530

UNITED STATES PATENT OFFICE 2,580,530

BATTERY SUMP

James I. Diley, Carroll, Ohio

Application November 25, 1947, Serial No. 788,073

1 Claim. (Cl. 136—178)

This invention relates to a sump, sometimes referred to as a "sump jar," of the type utilized particularly in connection with certain kinds of aircraft, especially those, such as fighters, that assume sharply angled and reversed positions during flight. With craft of this kind, the batteries have been provided with sumps or sump jars having tubular connections with the battery for receiving excess battery acids developing when the battery "boils over," that is, deposits such acids exteriorly. The difficulty, heretofore, has been that, in fighter planes and the like, which at times fly at sharp inclinations and in complete reverse, the battery acid deposited in the sump jar is ejected into the static air vent tube, associated with the sump, when such positions are assumed. And the acid is destructive not only of the vent tube but of practically any parts of the ship, such as adjacent control cables, with which the acid comes in contact. Such results, which have occurred many times, are obviously both dangerous and expensive. Complete aircraft have been rendered worthless by such leakage of battery acids.

The invention herein disclosed eliminates the damaging results described by the provision of a sump which comprises means that trap the acid against leakage under circumstances of the kind mentioned.

An object of the invention is to provide a simple and efficient sump for the purpose indicated.

Another object is to provide a simple and effective valve connection between the sump jar and the static vent tube associated therewith, for eliminating difficulties such as those above outlined.

Another object is the provision of such valve means which are readily removable and replaceable and which are constructed for quick disassociation of parts for purposes of cleaning.

These and other objects are attained by the means described herein and illustrated in the accompanying drawing, in which.

Figure 1:
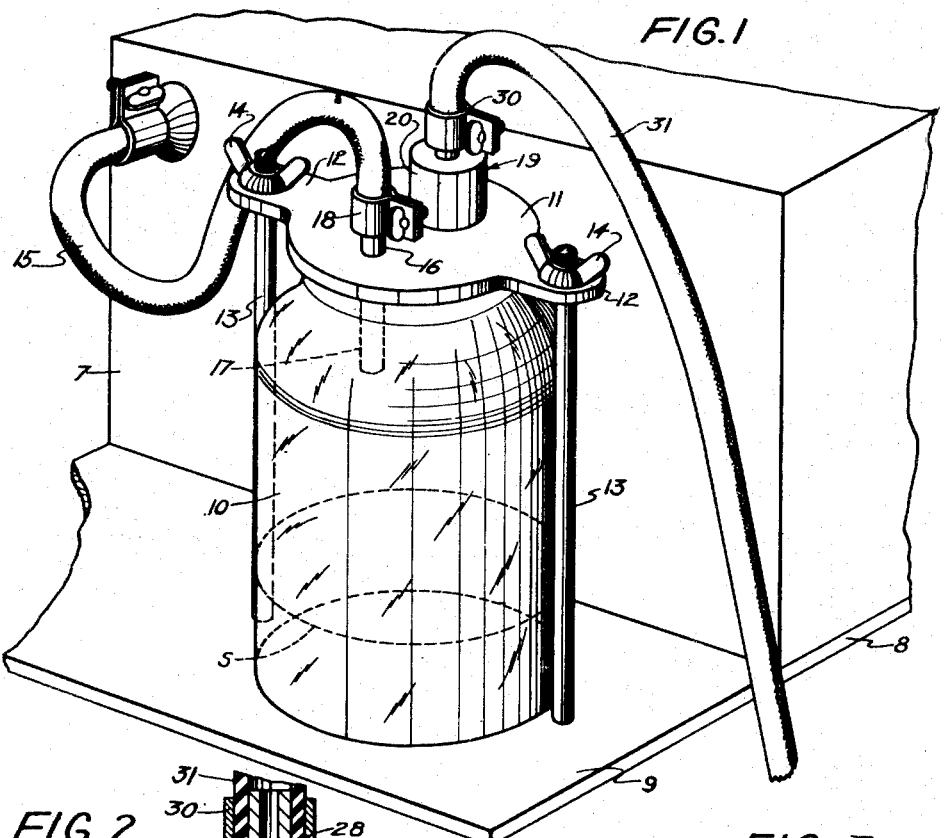
Figure 1 is a perspective view of my invention associated with a battery, the latter being partially shown.
Figure 2:
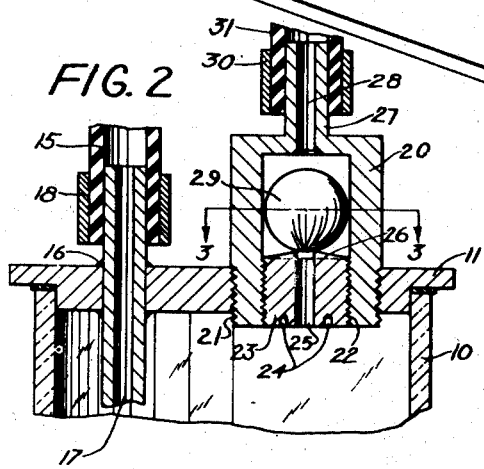
Figure 2 is a longitudinal cross-section view through the top portions of the sump, valve, and associated means of my invention.
Figure 3:
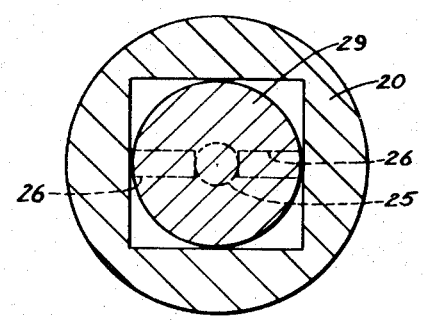
Figure 3 is a cross-sectional view on line 3—3 of Figure 2.
Figure 4:
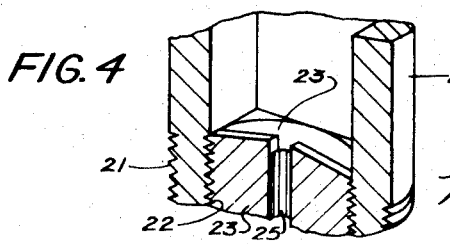
Figure 4 is a fragmental detail view, partly in longitudinal cross-section, through the lower part of the valve chamber of my invention.

With reference to the drawings, a battery 7 is shown as mounted on a suitable base 8 projecting as at 9 at one side to provide a support for a sump jar 10. A sponge, indicated at S, may be placed in the bottom of the jar. A non-corrosive cover 11 is attached to the open top of the jar in tight fit relation and is formed with ears 12 for receiving securing rods 13 having threaded top ends adapted to receive wing-nuts 14, bearing against the ears 12.

An acid discharge tube or line 15 proceeds from the battery to the cover 11 and extends therethrough into the jar 10 as at 16, through the medium of a stub tube 17 to which the line 15 is removably attached, as at 18. The cover also supports a valve, indicated generally at 19, and comprising a hollow chamber or body 20 exteriorly threaded, as at 21, for threaded insertion into an opening in the cover 11. This lower part of the valve body is formed with a relatively large, interiorly threaded bore 22 adapted to receive a plug 23 which constitutes the bottom of the valve chamber. The plug may be provided with recesses 24 engageable by a suitable tool for positioning and removal of the plug. The plug 23 has a restricted central bore 25 whereby communication of the valve chamber with the interior of the sump jar is afforded.

The inner end of the plug 23 is provided with raised portions which may be in the form of radial ridge members 26, inclined upwardly toward the center of the plug and having their apexes adjacent the inner end of bore 25, for a purpose to be described.

The upper end of valve body 20 is formed with an extension 27 through which a bore 28, axially aligned with bore 25, extends into the valve chamber. A ball 29 is positioned in the chamber, having a slight clearance with the sides of the chamber and a somewhat greater clearance with the ends thereof. The ball normally seats on the apex portions of the ridges 26 and is thus precluded from closing the bore 25. Upon angular or reverse positioning of the valve, however, the ball moves to the top end of the chamber and effectively closes the inner end of the bore 28.

The extension 27 on the top of the valve body is adapted to have removably secured thereto, as by the clamp 30, an end of a static vent tube 31 which, during normal flight of the craft in which the present apparatus is mounted, functions to vent the interior of the jar or container 10. When the position of the plane is steeply angled or reversed, the valve ball, moving to the normally upper end of its chamber, closes off the bore 28 and thus prevents any acid from the sump jar from entering the static vent tube 31, thereby eliminating the dangers and losses heretofore referred to.

Modifications readily suggest themselves upon consideration of the means herein disclosed, but these are believed to be comprised within the spirit and scope of the present invention.

What is claimed is:

The combination with a wet battery having a casing containing a liquid electrolyte, of a closed container supported for movement with said battery, said container having a top, an electrolyte conduit leading from the interior of said battery casing and passing downwardly through the container top, a static vent conduit leading away from said container, and valve means on the container top to which said static vent conduit is connected, said valve means having a gravity operated valve element ineffective to prevent communication between the interior of said container and said vent conduit while said container and said battery are in erect positions and acting to close communication between the interior of said container and said vent conduit while the container and the battery are moved into sharply angulated or inverted positions, said valve means comprising a vertical cylindrical body extending through said top, said body having an upper end, a restricted tubular portion on said upper end to which said vent tube is connected, said tubular portion opening at its lower end through said upper end, a valve seat at the lower end of said tubular portion, a single ball check free for vertical movement in said body, said valve body having a lower end having a restricted vertical passage communicating with the interior of said body and with the interior of said container, said ball check normally resting upon said lower end, said lower end having ridge means rising above the upper end thereof whereby said ball check is elevated out of closing relation to said restricted passage in the erect positions of said container and said battery, said ball check being arranged to move toward the upper end of said body and closingly engage said valve seat whenever said container and said battery are moved into sharply angulated or inverted positions.

JAMES I. DILEY.

REFERENCES CITED

The following references are of record in the file of this patent:

UNITED STATES PATENTS

| Number | Name | Date |
|---|---|---|
| 944,079 | Decker | Dec. 21, 1909 |
| 954,178 | Fowler | Apr. 5, 1910 |
| 1,724,878 | Jensen | Aug. 13, 1929 |
| 2,062,218 | Gielen | Nov. 24, 1936 |
| 2,151,278 | Milhaupt | Mar. 21, 1939 |
| 2,343,663 | Gregory | Mar. 7, 1944 |

OTHER REFERENCES

Plastics, page 45, August 1944.